(12) United States Patent
Bhattacharyya et al.

(10) Patent No.: US 6,808,179 B1
(45) Date of Patent: Oct. 26, 2004

(54) TURBOMACHINERY SEAL

(75) Inventors: Abhijit Bhattacharyya, Revere, MA (US); William D. Marscher, Morristown, NJ (US)

(73) Assignee: Concepts ETI, Inc., White River Junction, VT (US)

( * ) Notice: Subject to any disclaimer, the term of this patent is extended or adjusted under 35 U.S.C. 154(b) by 335 days.

(21) Appl. No.: 09/127,372

(22) Filed: Jul. 31, 1998

(51) Int. Cl.[7] ............................................. F01D 11/08
(52) U.S. Cl. ..................... 277/348; 277/351; 277/355; 415/174.3
(58) Field of Search .......................... 415/174.2, 174.3, 415/174.5, 230, 231; 277/348–349, 350, 351, 355

(56) References Cited

U.S. PATENT DOCUMENTS

| | | | |
|---|---|---|---|
| 885,032 A | | 4/1908 | De Ferranti |
| 1,085,351 A | | 1/1914 | McCandless |
| 3,279,802 A | | 10/1966 | Carre ........................... 277/57 |
| 3,917,150 A | | 11/1975 | Ferguson et al. ........... 228/159 |
| 3,932,947 A | | 1/1976 | Smoot .......................... 34/242 |
| 4,924,817 A | | 5/1990 | Seelen ......................... 122/379 |
| 5,026,252 A | * | 6/1991 | Hoffelner ................. 415/174.2 |
| 5,106,104 A | | 4/1992 | Atkinson et al. ............... 277/1 |
| 5,110,033 A | | 5/1992 | Noone et al. ................ 228/160 |
| 5,181,728 A | | 1/1993 | Stec .............................. 277/53 |
| 5,201,530 A | | 4/1993 | Kelch et al. ................... 277/53 |
| 5,308,088 A | * | 5/1994 | Atkinson et al. ............ 277/198 |
| 5,316,318 A | * | 5/1994 | Veau ............................ 277/53 |
| 5,568,931 A | * | 10/1996 | Tseng et al. ................. 415/230 |
| 5,597,167 A | * | 1/1997 | Snyder et al. ............... 277/136 |
| 5,613,829 A | | 3/1997 | Wolfe et al. .............. 415/174.1 |
| 5,752,805 A | * | 5/1998 | Gail et al. ................... 415/229 |
| 5,794,938 A | * | 8/1998 | Hofner et al. ............... 277/184 |
| 6,032,959 A | * | 3/2000 | Carter ...................... 415/174.2 |
| 6,079,945 A | * | 6/2000 | Wolfe et al. ................ 415/231 |

OTHER PUBLICATIONS

NASA Technical Memorandum 107501, Bidirectional Brush Seals—Post–Test Analysis, by Robert C. Hendricks, Jack Wilson, Tom Y. Wu, Ralph Flower and Robert L. Mullen, dated Nov. 1997.

NASA Technical Paper 3536, Brush Seals for Cryogenic Applications, by Margaret P. Proctor, James F. Walker, H. Douglas Perkins, Joan F. Hoopes and G. Scott Williamson, dated Oct. 1996.

NASA Technical Memorandum 107158, A Brush Seals Program Modeling and Developments, by Robert C. Hendricks, Ralph Flower and Harold Howe, 9th International Symposium of Transport Phenomena in Thermal–Fluids Engineering, dated Jun. 1996.

NASA, Turbomachine Sealing, by Robert C. Hendricks, Seals Code Development Workshop, dated Jun. 1995.

(List continued on next page.)

Primary Examiner—Stephen M. Johnson
(74) Attorney, Agent, or Firm—Downs Rachlin Martin PLLC

(57) ABSTRACT

A turbomachinery seal (20) attached to annular member (30) which surrounds and rotatably engages a shaft (34). The seal is capable of sealing pressure differentials between a high pressure region (24) and a low pressure region (26) well in excess of 300 psi at relatively low leakage rates. One embodiment (120) of the seal includes a plurality of confronting plates (128) arranged so as to form an annular structure. Another embodiment (220) includes a plurality of bristle packs (252), each positioned between annular plates (256) having an axial taper (278) adjacent radially inner ends (274). In another embodiment (320) bristles 334' and 334" extend in axial positive and negative directions so as to create an interleaved bristle structure. In yet another embodiment (720), a plurality of elongate members (450) are embedded within bristles (434). A turbomachine (550) includes seals 520' and 520" of the invention.

31 Claims, 7 Drawing Sheets

OTHER PUBLICATIONS

AIAA 97–2731, Advanced Seal Development for Large Industrial Gas Turbines, by Raymond E. Chupp, Robert J. Prior, Robert G. Loewenthal and Robert P. Menendez, 33rd AIAA/ASME/SAE/ASEE Joint Propulsion Conference & Exhibit, dated Jul. 1997.

AIAA, Journal of Propulsion and Power, Model Developments for the Brush Seal Numerical Simulations, by V.V. Kudriavtsev and M.J. Braunt, vol. 12, No. 1, pp. 193–201, dated Jan.–Feb. 1996.

AIAA 95–3146, Brush Seal Development For Large Industrial Gas Turbines, by Raymond E. Chupp, Robert P. Johnson and Robert G. Loewenthal, 31st AIAA/ASME/SAE/ASEE Joint Propulsion Conference and Exhibit, dated Jul. 1995.

AIAA, Journal of Propulsion and Power, Evaluation of Brush Seals for Limited–Life Engines, by R.E. Chupp and P. Nelson, vol. 9, No. 1, pp. 113–118, dated Jan.–Feb. 1993.

Journal of Turbomachinery, Generalizing Circular Brush Seal Leakage Through A Randomly Distributed Bristle Bed, by R.E. Chupp and G.F. Holle, vol. 118, pp. 153–161, dated Jan. 1996.

The American Society of Mechanical Engineers, Brush Seal Leakage Performance with Gaseous Working Fluids at Static and Low Rotor Speed Conditions, by Julie A. Carlile, Robert C. Hendricks and Dennis A. Yoder, International Gas Turbine and Aeroengine Congress and Exposition, dated Jun. 1992.

The American Society of Mechanical Engineers, A Bulk Flow Model of a Brush Seal System, by R.C. Hendricks, S. Schlumberger, M.J. Braun, F. Choy and R.L. Mullen, International Gas Turbine and Aeroengine Congress and Exposition, dated Jun. 1991.

* cited by examiner

TURBOMACHINERY SEAL

This invention was made with Government support under SBIR Contract No. F04611-97-C-0057 awarded by the Air Force (Edwards Air Force Base). The Government has certain rights to the invention.

FIELD OF THE INVENTION

The present invention relates to turbomachinery seals of the type used in gas turbine engines and rocket turbopumps and, more particularly, to turbomachinery brush seals and plate seals.

BACKGROUND OF THE INVENTION

Significant challenges exist in sealing between static and high speed rotating parts in turbomachinery so as to limit fluid flow from a high pressure region to a low pressure region along the rotating part. Fluid leakage between high pressure and low pressure regions is undesirable because it wastes fluid (e.g., air, combustion gas, steam, etc.), causing a loss in power and efficiency. Yet with pressure differentials between high pressure and low pressure regions in known turbomachinery exceeding 1,000 psi and with rotational speeds in excess of 30,000 rpm for gas generator rotors in small engines and in rocket turbopumps, designing effective and long-lasting seals for turbomachinery has been problematic.

These design challenges are complicated by the fact that during transient operating conditions, e.g., during aircraft takeoffs and landings, various engine parts experience different thermal growth rates. As a result, excessive rubbing between seals and rotating parts can occur giving rise to excess wear of these components. Thus, a seal that provides adequate longevity and sealing capability during steady state operation, may not function satisfactorily under transient operating conditions.

Several types of seals have been developed to restrict the flow of fluid from a high pressure region to a low pressure region in turbomachinery. One type, labyrinth seals, are positioned between rotating and stationary members at the interface of high and low pressure regions. A labyrinth seal typically consists of one or more hardened seal teeth disposed on a rotating, substantially cylindrical, member and running close in proximity to a cylindrical or stepped cylindrical stator or stationary member. The seal teeth act to restrict the flow of fluid between the high pressure and low pressure regions.

Labyrinth seals generally perform well from the perspective of pressure differentials they are capable of sealing. However, labyrinth seals are deficient with respect to the relatively high amount of leakage that occurs through the seal. Labyrinth seals have leakage rates that are 50% to 90% greater than contemporary brush seals.

A second type of seal used in turbomachinery is brush seals. These seals consist of a plurality of compliant bristles which extend generally radially inwardly from an annular ring to which they are attached. The ring is typically clamped or otherwise secured to a static member and circumscribes and is mostly concentric with a rotating member. The brush seal is sized so that the bristles are biased against the shaft, typically being angled in the direction of rotation of the shaft. During operation the bristles rub against the shaft, compliantly deforming due to centrifugal and thermal growth and eccentric rotation of the shaft, thereby maintaining their sealing capability. As noted above, in contrast to labyrinth seals, brush seals typically have significantly lower leakage rates.

Various improved brush seal designs have been developed with a goal of sealing ever-increasing pressure differences between adjacent high pressure and low pressure regions. Atkinson et al. disclose in U.S. Pat. No. 5,106,104, a multiple stage brush seal consisting of a plurality of seal assemblies that include a front plate, a plurality of bristles and a backing plate which has a greater radial length than the front plate. Each seal assembly is axially spaced from adjacent seal assemblies. The bristle density decreases from the high pressure side to the low pressure side of the seal, while the spacing between the backing plates and the rotor increases from the high pressure side to the low pressure side of the seal.

Kelch et al. disclose in U.S. Pat. No. 5,201,530 a unitary brush seal having multiple layers of bristles. The packing density of the bristles decreases from the high pressure side to low pressure side of the seal, while the clearance between the bristles and the rotor increases from the high pressure side to the low pressure side of the seal.

While brush seal designs in these patents may represent an advance in the art, they suffer from a significant short coming known to all brush seals. Specifically, it is believed all known brush seals are incapable of restricting the flow of fluid from a high pressure region to a low pressure region in turbomachinery where (a) the pressure differential exceeds about 250–300 psi and (b) the flow through or "leakage" past the seal is less than 10% of what would occur in the annular space where the brush seal is exposed, i.e., are axially unsupported by backing plates or other structure, if the seal was not present in this annular space. This limitation is significant as advances in turbomachinery, i.e., particularly gas turbine engines and turbo rocketpumps, require sealing of larger pressure differentials between high pressure and low pressure regions as a consequence of increased performance demands.

Hendricks et al. in the article "Bidirectional Brush Seals-Post Test Analysis," NASA Technical Memorandum 107501, November, 1997, disclose in illustrations on page 11 two bidirectional brush seal designs. The brush seals are bidirectional in the sense that the high pressure region may confront either side of the brush seal. The Hendricks et al. brush seal designs feature a bristle bed and a pair of annular backing plates on opposite sides of the bristle bed. The backing plates have an equal radial length which is less than the radial length of the bristle bed. In the outer brush seal version of the Hendricks et al. brush seal, the axial thickness of the bristle bed increases from the radially innermost end to the radially outermost end. The inner brush seal version of the Hendricks et al. brush seal tapers oppositely, i.e., its axial thickness decreases from its radially innermost end to its radially outermost end. In both cases, only a relatively small portion, i.e., about 10%, of the entire length of the bristle bed is in direct contact with the annular backing plates. The majority of the radial length of the bristle bed, i.e., about 80% of its radial length, is surrounded by the annular plates, but is spaced from the plates by an axial distance equal to about the axial thickness of the bristle bed at its axially thinnest point. Only a relatively small portion, i.e., about 10%, of the radial length of the bristle bed is not supported in or surrounded by the annular backing plates.

While the Hendricks et al. brush seals are bidirectional, it is believed they continue to suffer from some of the problems discussed above with respect to known brush seals. In particular, it is believed the axial gap between the bristle bed and adjacent backing plates which extends over the majority of the radial length of the bristle bed will cause bending and bunching up of the discrete bristles. This bunching up can create gaps in the unsupported portion of the bristle bed through which fluid leakage can occur.

As a result of these limitations in known labyrinth seals and brush seals, improvements in turbomachinery, particularly rocket turbopumps, has been impeded.

SUMMARY OF THE INVENTION

One aspect of the present invention is a seal assembly designed for use with a first member, e.g, a shaft or impeller hub. The assembly comprises a support with a central axis and a seal attached to the support so that a portion of the seal extends radially beyond the support. This portion of the seal defines an annular space. The seal is sized to engage the first member so as to permit relative rotational movement between the first member and the seal. The seal, when positioned between a high pressure region and a low pressure region and engaging the first member, maintains a pressure difference of greater than 300 psi between the high pressure region and the low pressure region while permitting relative rotational movement between the first member and the seal and limiting leakage between the high pressure region and the low pressure region such that fluid flow from the high pressure region to the low pressure region through the seal does not exceed thirty percent of what such fluid flow would be through the annular space if such portion of the seal did not occupy the annular space.

Another aspect of the present invention is a plate seal designed for use with a first member. The seal comprises a support having a central axis and a plurality of plates attached to the support. Each plate has a first major surface and an opposite second major surface. The plurality of plates are arranged so that with respect to adjacent ones of the plurality of plates the first major surfaces confront the second major surfaces. In addition, the plurality of plates is attached to the support so that planes coincident with the major surfaces do not intersect the central axis.

Yet another aspect of the present invention is a brush seal intended for use with a first member. The seal comprises a support having a central axis and a plurality of annular plates attached to the support so that each of the plates is spaced a first axial distance from adjacent plates, as measured along the central axis, so as to form a cavity between adjacent plates. Each of the plates has an axial thickness, a radially inner end and a radially outer end, with at least one of the plurality of plates having a taper adjacent its radially inner end in which such axial thickness decreases from (i) a first amount proximate, but spaced from, the radially inner end to (ii) a second, lesser, amount at the radially inner end. The seal also includes a plurality of bristles positioned in at least some of the cavities.

Still another aspect of the present invention is a turbomachine that comprises a first region, a first member supported for rotation about a central axis, and a housing having a second region in which the first member is received. The second region is sized and configured so that the first member can rotate relative to the housing within the second region. The turbomachine also includes a seal of the type described above attached to the first member and the housing so as to maintain a pressure differential between the first region and the second region.

Other aspects of the present invention are described elsewhere herein and are illustrated in the accompanying drawings. As such, the preceding summary of the invention is illustrative and not limiting.

DETAILED DESCRIPTION OF THE INVENTION

Figure 1:
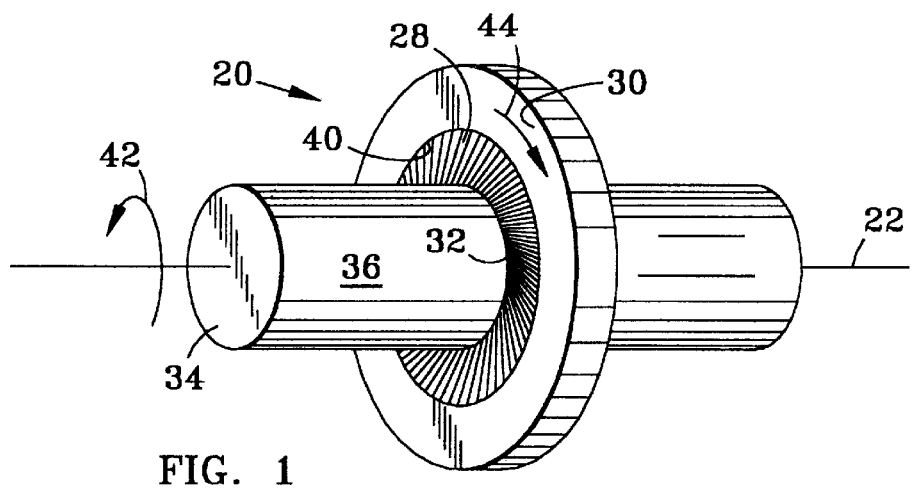
FIG. 1 is a perspective view of a generic version of the turbomachinery seal of the present invention.
Figure 2:
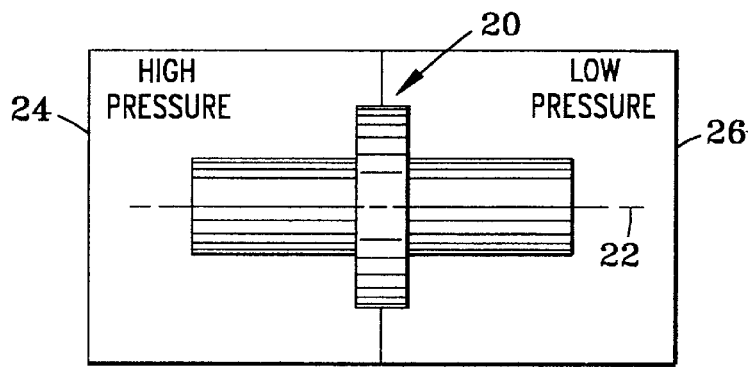
FIG. 2 is a side elevation view of the seal of FIG. 1, and includes a schematic depiction of the high pressure and low pressure regions between which the seal is positioned.

Referring to FIGS. 1 and 2, the present invention is a turbomachinery seal 20 having a central axis 22. As used herein, "axial" means parallel to axis 22 and "radial" means perpendicular to, and extending in ray-like fashion out from, axis 22. Seal 20 is designed to be positioned between high pressure region 24 and low pressure region 26. Seal 20 includes a plurality of discrete seal elements 28 arranged in an annular configuration and an annular member 30 to which the elements 28 are attached.

Seal 20 is generic to the various embodiments of the invention discussed below. As discussed hereinafter, elements 28 may comprise a plurality of plates, bristles, and bristles in combination with other structures. As a result of the arrangement of elements 28 in an annular configuration, the elements include a central bore 32 that is concentric with central axis 22. Bore 32 is sized to receive a shaft 34 having a circular cross section, with an interference fit, i.e., so that elements 28 frictionally engage outer surface 36 of shaft 34. In this regard, elements 28 occupy the annular space 40 between surface 36 of shaft 34 and housing 30.

In a typical application for seal 20, shaft 34 rotates about central axis 22 in the direction indicated by arrow 42 and seal 20 is maintained stationary. Alternatively, seal 20 may be caused to rotate in the direction indicated by arrow 44 and shaft 34 is maintained stationary. In yet another application, shaft 34 may be rotated in the direction of arrow 42 and seal 20 may be rotated in the direction of arrow 44. In all cases, it is preferred elements 28 be radially inclined with respect to shaft 34 in the direction of relative rotation, as indicated in FIG. 1 and as discussed in more detail below.

Unlike known turbomachinery seals, including state-of-the-art brush seals, seal 20 when positioned between high pressure region 24 and low pressure region 26 as illustrated in FIG. 2 is capable of sealing a pressure difference between these regions significantly in excess of 250–300 psi. This is beyond the pressure differential sealing capability of known turbomachinery contact or brush seals. Indeed, pressure differentials between high pressure region 24 and low pressure region 26 in excess of 1,000 psi may be sealed with seal 20.

This sealing capability is achieved with a fluid flow rate between high pressure region 24 and low pressure region 26 of as little as 10% or less of what the fluid flow rate would be through annular space 40 if elements 28 were not present in the annular space. Thus, while absolute sealing between high pressure region 24 and low pressure region 26 is not obtainable with seal 20, as is the case with all known brush seals and other turbomachinery seals, the extent of leakage from high pressure region 24 to low pressure region 26, the cross seal 20 is relatively low.

An important advantage of seal 20, and all its embodiments, is that it is bidirectional with respect to pressure differential. As a result, high pressure region 24 and low pressure region 26 may be axially reversed without affecting the functionality of the seal.

The preceding discussion of seal 20 is generic to all embodiments of the turbomachinery seal of the present invention. A detailed description of the various embodiments of brush seal 20 follows, with each embodiment being identified by a unique hundreds series identifier, i.e., the seal of the first embodiment is identified as seal 120, the seal of the second embodiment is identified as seal 220 and so forth. Central axis 22, shaft 34, surface 36 and arrow 42 are common to all embodiments and so are referenced using these numbers in connection with the description of all embodiments.

Figure 3:
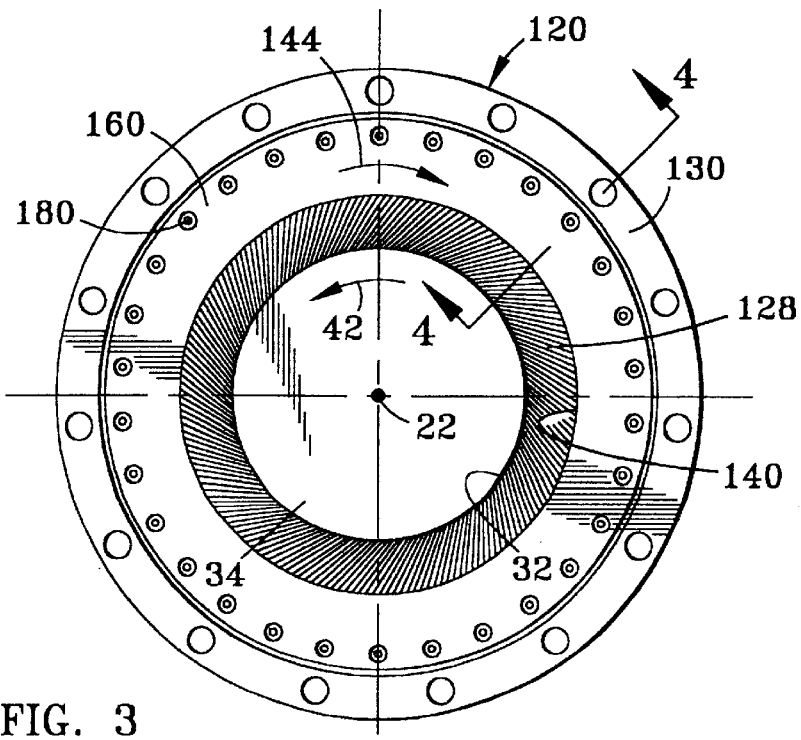
FIG. 3 is the side elevation view of a first embodiment of the seal of the present invention.
Figure 4:
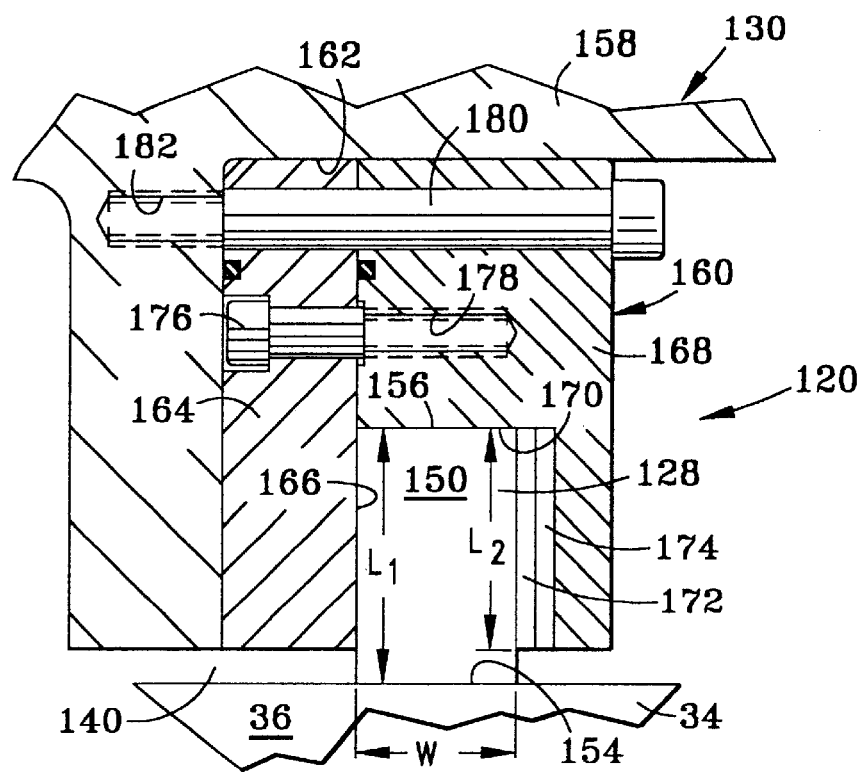
FIG. 4 is a partial cross-sectional view of the seal illustrated in FIG. 3, taken along line 4—4 in FIG. 3.
Figure 5:
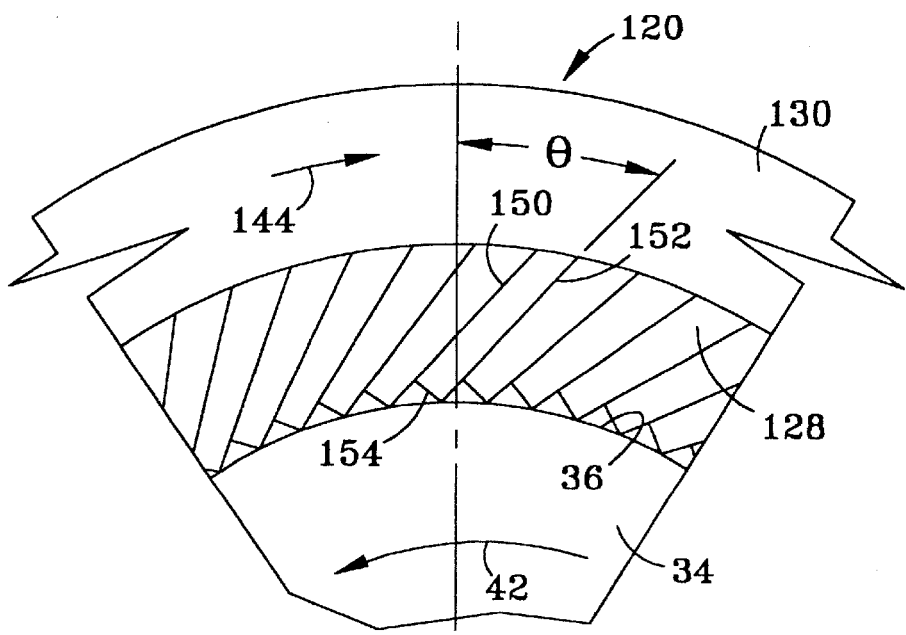
FIG. 5 is an enlarged partial side elevation view of the seal illustrated in FIG. 3.

Referring to FIGS. 3–5, seal 120 of the first embodiment of the present invention comprises a central axis 22 and a plurality of plates 128 which are attached to annular member 130. No bristles are used in seal 120. Plates 128 typically have a rectangular configuration, as best illustrated in FIG. 4, although other configurations are encompassed by the present invention. As described in more detail below, plates 128 are secured to one another so as to form an annular structure having a central bore 132 sized to receive a shaft 34 with an interference fit such that plates 128 interfere with surface 36 of the shaft during relative rotation between the shaft and the seal. Annular member 130 is sized so that an annular space 140 exists between shaft 34 and housing 130.

As best illustrated in FIG. 5, plates 128 are attached to housing 130 so as to be inclined at an angle θ with respect to radii of central axis 22. Angle θ may vary from 30° to 55°, with about 45° being preferred. This inclination of plates 128 is in the direction of relative rotation between seal 120 and shaft 34, e.g., in the direction of rotation of the shaft 34 indicated by arrow 42. As noted above with respect to seal 20, seal 120 is designed for use under any of the following conditions: (a) when shaft 34 is rotated in the direction indicated by arrow 42 and seal 120 is maintained stationary, (b) when seal 120 is rotated in the direction indicated by arrow 144 and shaft 34 is maintained stationary and (c) when seal 120 is rotated in the direction indicated by arrow 144 and shaft 34 is rotated in the direction as indicated by arrow 42.

Describing plates 128 in more detail, each plate has a first major surface 150 and a second, opposite, major surface 152. The term "major" is used here to distinguish these surfaces from edges of plates 128. Surfaces 150 and 152 preferably extend in parallel. However, the present invention encompasses plates having a thickness that varies from radially inner end 154 (FIGS. 4 and 5) to radially outer end 156 (FIG. 4). In this regard, variation in thickness, i.e., spacing between surfaces 150 and 152, illustrated in FIG. 5 is not intended to be limiting. That is, unlike what is shown in FIG. 5, in many applications of seal 120, plates 128 have a uniform thickness from radially inner end 154 to radially outer end 156.

Plates 128 preferably have a thickness of about 0.002" to 0.004", with a thickness of about 0.003" being preferred. Plates 128 are positioned so that a first surface 150 of one plate confronts and extends substantially parallel to second surface 152 of an adjacent plate. Plates 128 are preferably coated with a solid lubricant (not shown) such as molybdenum disulfide to allow a small relative motion between the plates. Depending upon the properties of the solid lubricant used, a gap between adjacent plates 128 of somewhat less than 0.0005" is provided by virtue of the presence of the lubricant. While use of a solid lubricant between plates 128 is not an essential aspect of seal 120, use of such lubricant is preferred. If a lubricant is not used, it is still preferred that a gap between plates of about 0.0005" or less be provided. When shaft 128 makes small excursions relative to central axis 22, some relative motion occurs between plates 128. The solid lubricant together with the slight gap between plates 128 allows the plates to slide relative to one another, thereby counteracting the tendency of the plates to "bunch up" and create gaps that would reduce the sealing effect.

Describing further the positioning of plates 150 with respect to central axis 22, major surfaces 150 and 152 of plates 128 are arranged, in addition to being inclined at an angle θ relative to radii of central axis 22, so as to extend substantially perpendicular to a plane intersecting axis 22 and extending perpendicular thereto. Thus, in a radial cross section of seal 120, e.g., as taken along line 4—4 in FIG. 3, substantial portions of surfaces 150 or 152 are visible, as shown in FIG. 4. In this regard, to facilitate illustration of plates 128, the latter are shown in their entirety. A true cross section would show portions of several plates due to the radial inclination of the plates identified by angle θ. As a result of this positioning of plates 128, planes (not shown) coincident with surfaces 150 and 152 do not intersect central axis 22.

Regarding the material characteristics of plates 128 it is preferred the plates be made from a very hard, but flexible material. Preferred materials for plates 125 have a yield point in the range of 50–300 ksi, breaking point in the range 50–300 ksi and an elongation up to the breaking point of 20–30 percent. A suitable material for plates 128 is Haynes 25 superalloy.

Referring to FIG. 4, the length $L_1$ and width W of plates 128 will vary as a function of intended application. In this regard length $L_1$ is typically greater when seal 120 is used with a relatively large diameter shaft 34 than when used with a relatively small diameter shaft. Similarly, width W typically varies as a function of the pressure differential between high pressure region 24 and low pressure region 26, i.e., width increases with increases in pressure differential. However, length $L_1$ typically ranges from 0.25" to 1.0" and width W typically ranges from 0.1" to 0.5". Typically, although not necessarily, length $L_1$ is greater than width W.

Selection of materials used to make plates 128 must be made with respect to the physical and material characteristics of surface 36 of shaft 34 against which plates 128 rub, as discussed in more detail below. Assuming friction coefficients for plates 128 and surface 36 in the typical range of 0.01–0.15, for plates 128 having the material characteristics discussed above, it is important that surface 36 be very hard and exhibit relatively low thermal growth. In this regard, surface 36 preferably has a yield point in the range 100–150 ksi, a breaking point in the range of 130–200 ksi and an elongation of 18–30 percent. Suitable materials for surface 36, which is typically applied as a coating on the portion of shaft 34 that plates 128 engage, as Inconel 718 superalloy. Alternatively, surface 36 may be made from suitably hard ceramic materials. Regardless of the materials used, it is preferred that the Brinell hardness number of surface 36 and the Brinell hardness number of plates 128 differ by at least 50. In some applications it will be preferable to make surface 36 harder and in other applications plates 128.

The length $L_1$ is selected so that radially inner ends 154 of plates 128 engage surface 36 of shaft 34 with an interference fit on the order of 0.002" to 0.007", with a preferred interference of about 0.0035". The extent of interference is selected so that the normal force of plate 128 on shaft 34 is a roughly linear function of the pressure differential between high pressure region 24 and low pressure region 26. The extent of interference between plates 128 and shaft 34 further depends upon the temperature of fluid in high pressure region 24, e.g., whether it is cryogenic liquid or a hot gas, the intended longevity of seal 120, the relative surface velocity of surface 36 of the shaft with respect to plates 128 and material characteristics of plates 128 and shaft 34, particularly its surface 36.

Plates 128 may be attached to annular member 130 in accordance with the physical relationship discussed above by, for example, welding, clamping, brazing, by use of an adhesive such as epoxy, or by some combination of these techniques. In one embodiment of seal 120, annular member 130 includes an annulus 158 and a clamping structure 160 received in an annular recess 162 in annulus 158. Plates 128 are attached to annulus 158 by clamp structure 160. The latter includes a first clamping plate 164 having a planar surface 166 for engaging one edge of plates 128, i.e., the left edge of the plates as viewed in FIG. 4, and a second clamping plate 168. The latter includes an annular cutout 170 for receiving plates 128, a backing plate 172 positioned to engage an edge of plate 128 opposite the edge engaged by clamping member 164, i.e., the right edge as viewed in FIG. 4, and a spring plate 174 positioned between annular cutout 170 and backing plate 172. Backing plate 172 is made from a relatively incompressible material such as 4140 steel or 6061 aluminum. Spring plate 172 is made from a material such as Grafoil which exerts a resistive spring force when a compressive force is applied, or may comprise an annular spring washer. First clamping plate 164 is attached to second clamping plate 168, after plates 128, backing plate 172 and spring plate 174 is installed in cutout 170, by a series of bolts 176 received in a threaded bore 178 in the second clamping plate. Clamp structure 160 is retained in annular recess 162 by a series of bolts 180 secured to threaded bores 182 in the annular member. While clamp structure 160 represents one design for clamping plates 128 together and to annulus 158, it is to be appreciated that other clamping structures are encompassed by the present invention.

Of greater importance to the design and operation of seal 120 than the absolute length $L_1$ is the ratio between $L_1$ and $L_2$. $L_1$ is the total length of plate 128, and $L_2$ is the length of that portion of plate 128 supported in annular member 130. The difference $L_1-L_2$ is equal to the free or unsupported length of plate 128 in annular space 140. The absolute value of the difference $L_1-L_2$ will depend upon the application in which seal 120 is used. However, this difference is typically in range of 0.02"–0.20". As a related matter, the ratio $L_2/L_1$ is typically at least 0.5, and is preferably in the range of 0.7–0.9.

Figure 6:
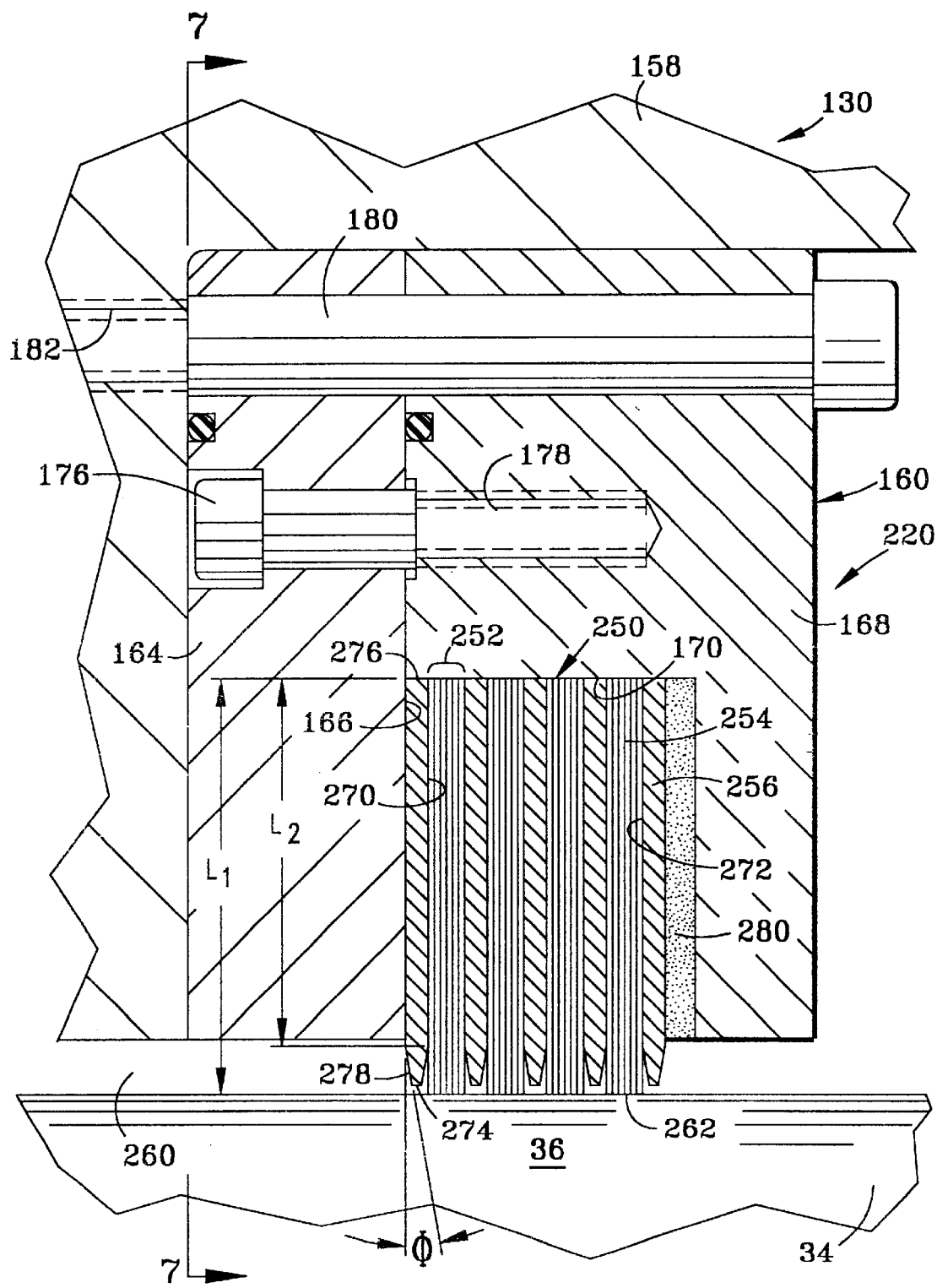
FIG. 6 is a cross sectional view of a second embodiment of the seal of the present invention.
Figure 7:
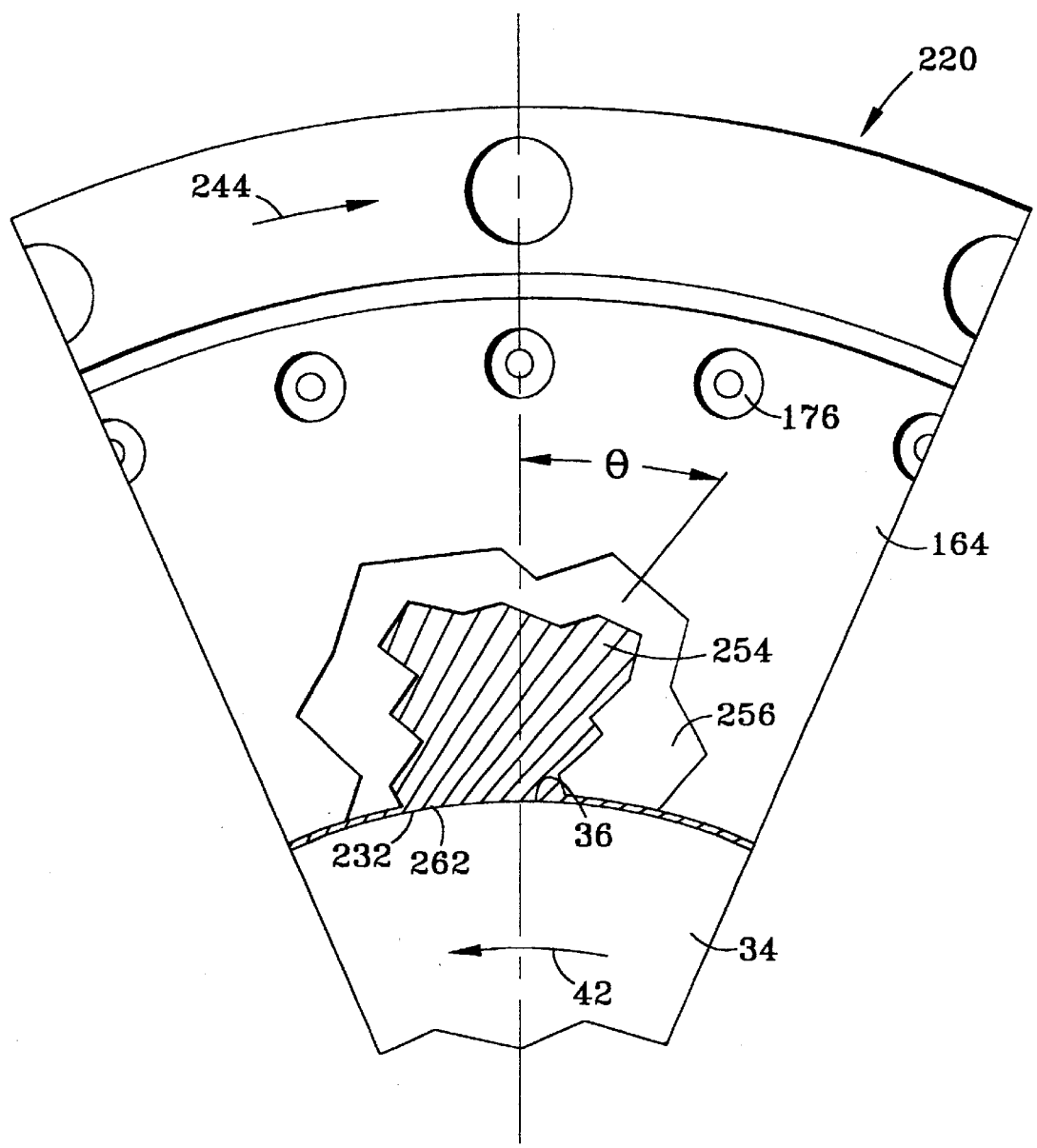
FIG. 7 is a partial side elevation view of the seal illustrated in FIG. 6, which is partially broken away to reveal internal construction.

Turning now to FIGS. 6 and 7, a second embodiment of the brush seal of the present invention is identified by reference number 220. Seal 220 is identical to seal 120 insofar as it includes annular member 130 having an annulus 158 and clamping structure 160. Although not illustrated in FIGS. 6 and 7, seal 220 also has a central axis 22. In addition, seal 220 is adapted for use with a shaft 34 having a surface 36. As described in detail below, seal 220 differs from seal 120 in that annular cutout 170 includes a brush seal 250 in place of plates 128.

Brush seal 250 comprises a plurality of parallel, axially spaced bristle packs 252, each including a plurality of bristles 254, and a plurality of parallel, axially spaced annular plates 256. Preferably, an annular plate 256 is positioned on either side, i.e., axially upstream and downstream, of each bristle pack 252. As described in more detail below, bristle packs 252 and annular plates 256 are positioned relative to one another so as to form an annular structure (not labeled) having a central bore 232 sized to receive shaft 34 with an interference fit such that bristles 254 rub against surface 36 of the shaft during relative rotation. Annular member 130 is sized relative to shaft 34 so that an annular space 260 exists between the housing and the shaft.

As best illustrated in FIG. 7, bristles 254 are attached to annular member 130 so as to be inclined at an angle θ with respect to radii of central axis 22. Angle θ may vary from 30° to 55°, with about 45° being preferred. This inclination of bristles 254 is in the direction of relative rotation between seal 220 and shaft 34, i.e., in the direction of rotation indicated by arrow 42. As with seal 120, seal 220 is designed for use under any of the following conditions: (a) when shaft 34 is rotated in the direction indicated by arrow 42 and seal 220 is maintained stationary, (b) when seal 220 is rotated in the direction indicated by arrow 244 and shaft 34 is maintained stationary, and (c) when seal 220 is rotated in the direction indicated by arrow 244 and shaft 34 is rotated in the direction indicated by arrow 42.

Describing bristles 254 in more detail, the diameter of the bristles is selected based on analyses of individual bristle stresses, bristle deflections and normal forces at the interface of the bristles and surface 36 of shaft 34 (to estimate heat generation and wear). Bristles 254 having a relatively small diameter are easily deflected which can give rise to loss of sealing capability. If the diameter of bristles 254 is relatively large, this can lead to excessive bristle stiffness, which in turn can lead to excessive heat generation at the interface of the bristles and surface 36 of shaft 34, thereby causing the tips of the bristles to melt or plasticize. Balancing these competing requirements, it has been determined that bristle diameters in the range 0.0015" to 0.0035" usually represent the best compromise, with a diameter of about 0.0025" being preferred. Bristles 254 are also preferably coated with molybdenum disulfide or other solid lubricant. In addition, bristles 254 are packed together sufficiently densely that a gap of less than 0.0005" exists between adjacent bristles.

As to materials characteristics for bristles 254, relatively flexible, hard materials that exhibit relatively low thermal growth are preferred. Furthermore, the materials used for bristles 254 preferably have a yield point in the range 30–500 ksi, a breaking point in the range 30–500 ksi and an elongation of 20–30%. As with plates 128, a difference in Brinell hardness number of 50 between bristles 254 and surface 36 of shaft 34 is preferred. One exemplary material for bristles 254 is Haynes superalloy 25 wire bristles.

As discussed with respect to plates 128, the materials used for bristles 254 must be compatible with the requirements of the environment in which seal 220 is used. In this regard, the characteristics of surface 36 relative to plates 128 described above in connection with the discussion of seal 120 are suitable for use with seal 220. The length $L_1$ of bristles 254 is selected so that radially inner ends 262 engage surface 36 of shaft 34 with an interference fit in the range 0.002" to 0.007", with a preferred interference of about 0.0035". The extent of interference is selected so that the normal force of bristles 254 on shaft 34 varies roughly linearly with the pressure differential between high pressure region 24 and low pressure region 26. The extent of the interference between bristles 254 and shaft 34 further depends upon the temperature of the fluid in high pressure region 24, e.g., whether it is a cryogenic liquid or a hot gas, the intended longevity of seal 220, the relative surface velocity between surface 36 and bristle ends 262 of shaft 34 and material characteristics.

The width of bristle packs 252, i.e., the axial thickness, depends upon the number of bristle packs used for a seal 220 of given axial length and for annular plates 256 of given axial thickness, and the pressure differential between high pressure region 24 and low pressure region 26. However, a width for bristle packs 252 of about 0.02" to 0.100" is preferred. The number of bristle packs 252 used in seal 220 is also selected based on these factors. It is preferred, however, that seal 220 include at least two, and preferably about 3–5 bristle packs 252.

Annular plates 256 have a first major surface 270 and a second major surface 272 opposite the first major surface. Preferably annular plates 256 have a uniform thickness from radially inner ends 274 to radially outer ends 276, with the result that surfaces 270 and 272 extend substantially in parallel. First major surface 270 and second major surface 272 extend substantially perpendicular relative to central axis 22 and extend substantially parallel to corresponding surfaces of adjacent plates. The term "major" is used in connection with surfaces 270 and 272 to distinguish these surfaces from ends 274 and 276. Annular plates 256 are arranged so that surface 272 from one plate engages bristles 254 of a given bristle bed 252, while surface 272 of an adjacent annular plate engages bristles on the axially opposite side of the given bristle bed. As such, bristles 254 in each bristle bed 252 are supported along the majority of their length by adjacent annular plates 256.

An important feature of the present invention, which distinguishes it relative to known multiple stage brush seals such as the one described in U.S. Pat. No. 5,106,104 to Atkinson et al., is that an axial taper 278 is provided on one or both of surfaces 270 and 272 adjacent radially inner end 274. When seal 220 is intended for use in an environment in which high pressure region 24 is positioned to the right of the seal and low pressure region 26 is positioned to the left of the seal, as viewed in FIG. 6, taper 278 is provided on at least surface 270, although it may also be positioned on surface 272. When the high and low pressure regions are reversed, i.e., the high pressure region is positioned to the left of seal 220 and the low pressure region is positioned to the right of the seal, as viewed in FIG. 6, taper 278 is provided on at least surface 272, although it may also be positioned on surface 270. To enable seal 220 to be used in either application, taper 270 is preferably provided on both surfaces 270 and 272, as illustrated in FIG. 6.

Taper 278 is configured so the axial thickness of annular plates 256 decreases from (a) a location proximate to, but spaced from, radially inner end 274 to (b) the radially inner end. The radial distance over which taper 278 occurs may be determined empirically with the goals of maintaining the necessary level of interference between radially inner ends 262 of bristles 254 and shaft 34 (so as to minimize leakage), while at the same time not creating excessive wear and heating of the bristles and surface 36 of the shaft. The radial length of taper 278 also depends on the overall radial length of annular plates 256. In this regard, the overall radial length of annular plates 256 is shorter than the overall length of bristles 254, and preferably is such that radially inner ends 274 of the annular plates are spaced about 0.002" to 0.015" from surface 36 of shaft 34. In this regard, the radial location at which taper 278 commences defines the ratio between the supported length $L_2$ of bristles 254 and the unsupported length of the bristles, $L_1-L_2$. An $L_2/L_1$ ratio of at least 0.8 is desired, with an $L_2/L_1$ ratio of about 0.9 being preferred. In this regard, the absolute free length, i.e., $L_1-L_2$, of bristles 254 will vary as a function of the diameter of shaft 34 and other aspects of the system in which seal 220 is used. However, an absolute free length for bristles 254 in the range 0.05" to 0.15" is preferred. The angle of taper 278, in an axial sense, may also be determined empirically. However, a taper angle $\phi$ (FIG. 6) which ranges from 2° to 15° is preferred.

While annular plates 256 typically have an identical configuration, in certain applications it may be acceptable to progressively decrease the radial length of annular plates, moving from the high pressure side to low pressure side of seal 220. In addition, if seal 220 is not required to be operable bidirectionally with respect to the relative locations of high pressure region 24 and low pressure region 26, then it may be possible to shorten, or even eliminate in some cases, the annular plate 256 at the side of seal 220 adjacent high pressure region 24.

Bristle packs 252 and annular plates 256 are attached to annular member 130 by, for example, welding, clamping, brazing, by use of an adhesive such as epoxy, or by a combination of these techniques. In the embodiment of seal 220 illustrated in FIG. 6, clamping structure 160 described above in connection with the discussion of seal 120, may be satisfactorily employed, as may other known clamping systems. Annular plates 256 with associated bristle packs 252 positioned therebetween, are positioned in annular cutout 170, with a backing plate 280 preferably being provided axially outboard of the axially outermost annular plate positioned within the annular cutout 170. Backing plate 280 is preferably made from 4160 steel or 6160 aluminum.

Figure 8:
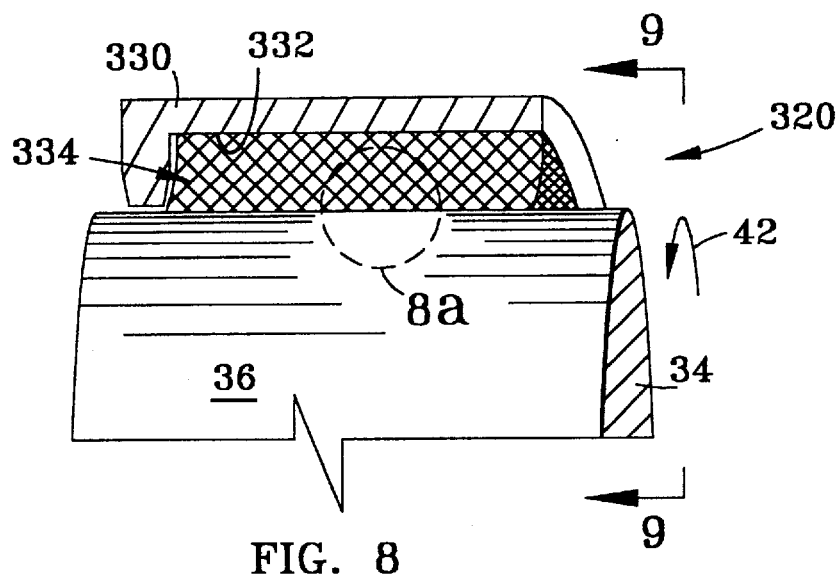
FIG. 8 is a partially broken away perspective view of a third embodiment of the seal of the present invention.
Figure 8A:
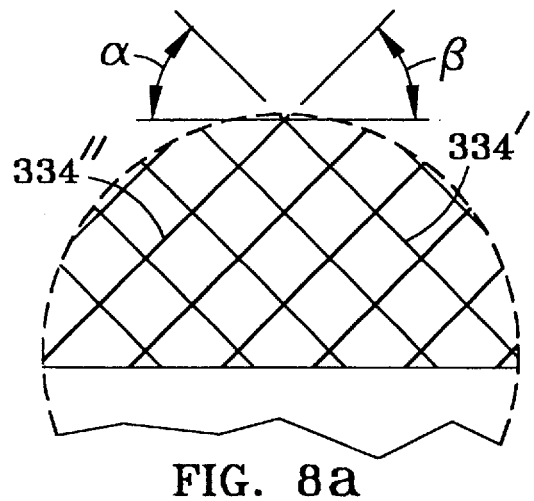
FIG. 8a is a partial, exploded view of the bristles illustrated in FIG. 8.
Figure 9:
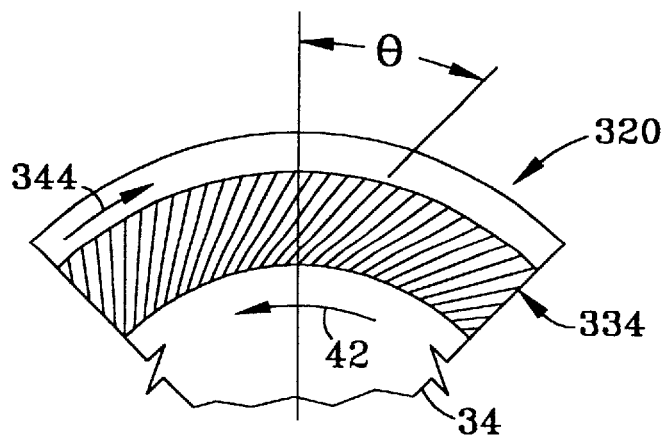
FIG. 9 is a partial side elevation view of the seal shown in FIG. 8.

Referring to FIGS. 8 and 9, a third embodiment of the brush seal of the present invention is identified by reference number 320. Seal 320 includes an annular member 330 having an annular recess 332 in which a plurality of bristles 334 are positioned. Although not illustrated in FIGS. 8 and 9, seal 320 has a central axis 22. In addition, seal 320 is adapted for use with a shaft 34 having a surface 36. As illustrated in FIG. 9, bristles 334 are attached to annular member so as to be inclined at an angle θ with respect to radii of central axis 22, where angle θ preferably varies from 30° to 55°, with about 450 being preferred. This inclination of bristles 334 is in the direction of relative rotation between seal 320 and shaft 34, i.e., in the direction of rotation indicated by arrow 42. As with seals 120 and 220, seal 320 is designed for use under any of the following conditions: (a) when shaft 34 is rotated in the direction indicated by arrow 42 and seal 320 is maintained stationary, (b) when seal 320 is rotated in the direction indicated by arrow 344 and shaft 34 is maintained stationary, and (c) when seal 320 is rotated in the direction indicated by arrow 344 and shaft 34 is rotated in the direction indicated by arrow 42.

Bristles 334 are also inclined in axially positive and axially negative directions, relative to central axis 22, as indicated in FIG. 8. More particularly, bristles 334' are positively axially inclined at an angle α with respect to radii of central axis 22 and bristles 334' are negatively axially inclined at an angle β with respect to radii of central axis 22. Angle α and β are preferably, but not necessarily equal, and preferably fall in the range 30° to 55°, with about 45° being preferred. Bristles 34' and 34" are preferably positioned in alternating relation, in an axial sense, so as to cause the bristles to interleave with one another. A single axial row of bristles 334 may include bristles 334' and 334" in alternating relation. Alternatively a single axial row of bristles 334 may consist exclusively of bristles 334' with the circumferentially adjacent row consisting entirely of bristles 334". Other arrangements are also encompassed by the present invention, subject to the requirement that a given bristle 34' be positioned in sufficient proximity to other bristles 34" so as to create an interleaved relationship, such as that illustrated in FIG. 8.

The diameter, materials characteristics, and interference fit with shaft 34 of bristles 334 are identical to the corresponding characteristics of bristles 254, as discussed above. Although spaces are illustrated between adjacent bristles 334 in FIGS. 8 and 9, it is to be appreciated that the bristles are packed sufficiently densely that each bristle contacts adjacent bristles, with a gap of about 0.0005" or less being provided between adjacent bristles. Preferably, but not necessarily, bristles 334 are coated with a solid lubricant such as molybdenum disulfide.

Bristles 334 are attached to annular member 330 by, for example, welding, clamping, brazing, by use of an adhesive such as epoxy, or by a combination of these techniques. For example, clamping structure 160 described above in connection with the discussion of seal 120 may be used to secure bristles in annular recess 332 of annular member 330.

Figure 10:
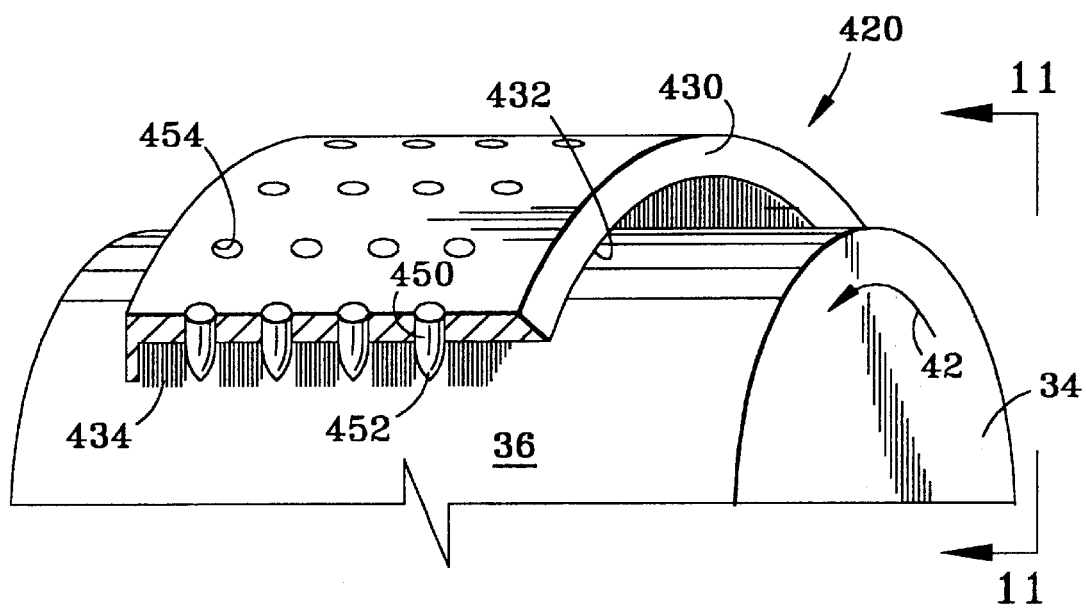
FIG. 10 is a partially broken away perspective view of a fourth embodiment of the seal of the present invention.
Figure 11:
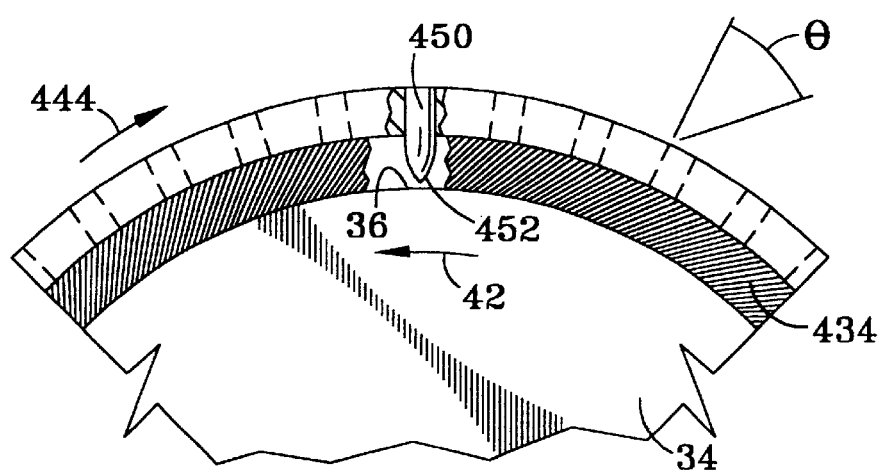
FIG. 11 is a partially side elevation view of the seal shown in FIG. 10.

Referring to FIGS. 10 and 11, the brush seal 420 of the fourth embodiment of the present invention includes an annular member 430 having an annular recess 432 provided therein. Like the other embodiments, seal 420 includes a central axis 22, not illustrated. Seal 420 is adapted for use with a shaft 34 having a surface 36.

Seal 420 includes a plurality of bristles 434 that are angled with respect to radii of central axis 22 at an angle θ, as illustrated in FIG. 11, like the other embodiments, angle θ preferably ranges from 30° to 55°, with about 45° being preferred. The inclination of bristles 434 is in the direction of relative rotation between seal 420 and shaft 34, i.e., in the direction of rotation indicated by arrow 42. The diameter, materials characteristics and extent of interference with shaft 34 of bristles 434 is the same as for bristles 254, as described above.

Seal 420 includes a plurality of elongate members 450 imbedded within bristles 434. Elongate members 450 have a radial length selected so that they are spaced somewhat, e.g., 0.002" to 0.015" from surface 36 of shaft 34. Elongate members 450 have a larger cross-section than bristles 434 and are significantly less flexible than the bristles. Elongate members 450 may have a circular, hexagonal, or other cross-sectional configuration. Preferably, but not necessarily, radially inner ends 452 of elongate members 450 taper to a point, as illustrated in FIGS. 10 and 11.

Groups of elongate members 450 are preferably axially and circumferentially aligned so as to form a grid of elongate members. The axial and circumferential spacing between elongate members 450 will depend upon the pressure differential between high pressure region 24 and low pressure region 26, and will depend upon the cross-sectional size of the elongate members. However, in one version of seal 420, bristles 434 extend over an overall axial distance of about 0.10" to 0.5", elongate members 250 have a circular cross-sectional diameter of about 0.030" to 0.10", and the elongate members are axially spaced about 0.030" to 0.050" from one another, and are circumferentially spaced about 0.030" to 0.050" from one another along the radially inner surface of annular member 430.

As with bristles 254, bristles 434 are densely packed so that only gap of less than about 0.0005" exists between bristles. In addition, bristles 434 are preferably coated with a dry lubricant such as molybdenum disulfide.

Bristles 434 and elongate members 452 are attached to annular member 430 by, for example, welding, clamping, brazing, by the use of an adhesive such as an epoxy, or by a combination of these techniques. In addition, elongate members 450 are preferably received in radially extending bores 454 in annular member 430. Clamping structure 160 described above in connection with the discussion of seal 120, may be used to secure bristles 434 within annular member 430.

Figure 12:
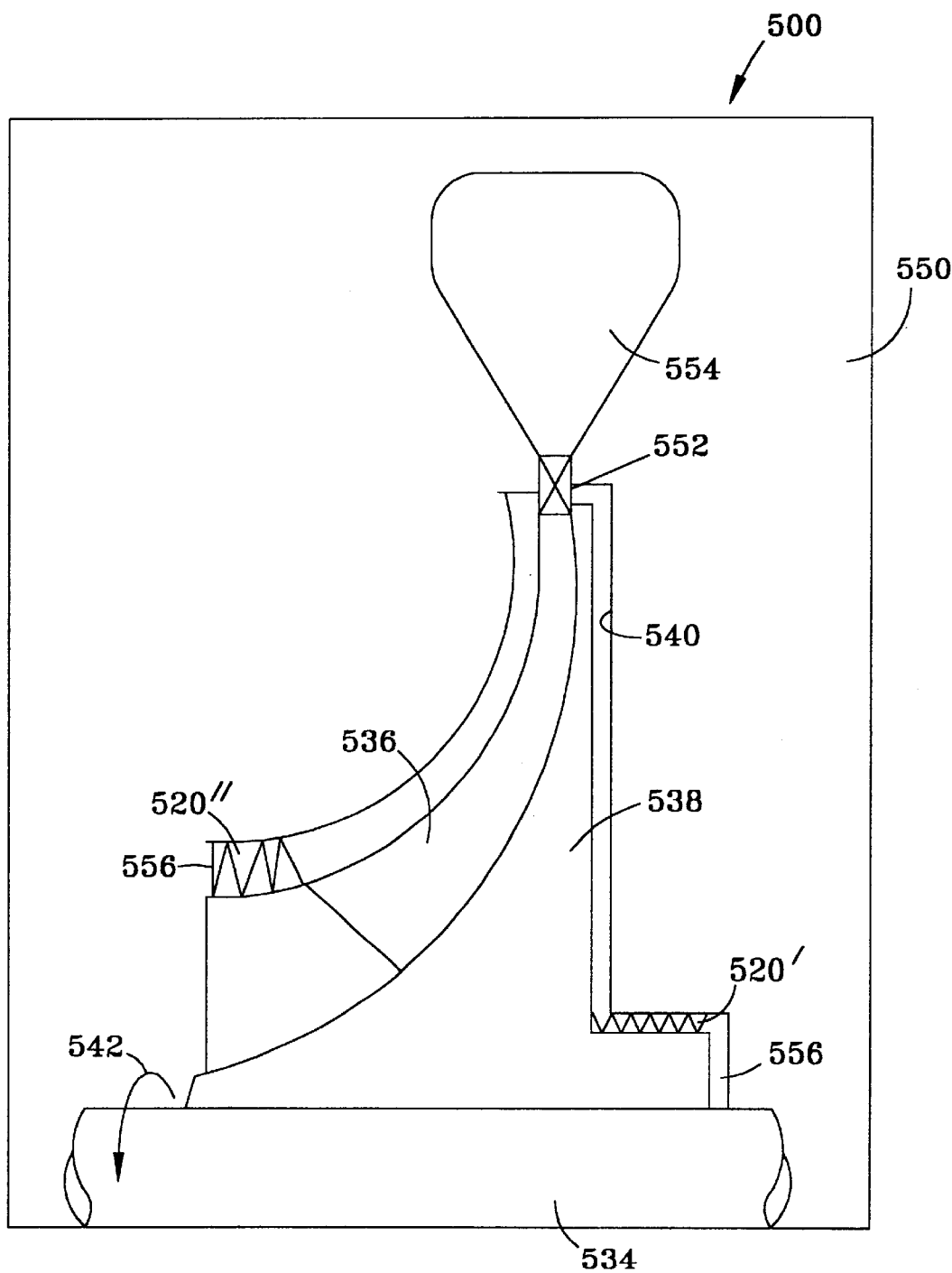
FIG. 12 is a schematic diagram of a turbomachine incorporating the seals of the present invention.

Referring now to FIG. 12, the turbomachinery seals of the present invention are adapted for use in a wide range of turbomachinery. FIG. 12 illustrates a generic turbomachine 500 in which the seals of the present invention are advantageously incorporated. Turbomachine 500 includes seal 520' and seal 520". Turbomachine 500 also includes a rotatably mounted shaft 534 to which an impeller blade 536 is rotatably mounted via hub 538 attached to the shaft. Impeller blade 536 and hub 538 are mounted for rotation within impeller blade passage 540, along with shaft 534, in the direction indicated by arrow 542. Surrounding impeller blade 536 is a housing 550 relative to which the impeller blade rotates. Fluid pressurized by impeller blade 536 enters diffuser 552 from which it is delivered to volute 554.

Referring to FIGS. 2 and 12, the portion of impeller blade passage 540 in fluid communication with seals 520' and 520" constitutes the high pressure region relative to which the seals are used, which is represented as high pressure region 24 in FIG. 2. The counterpart of low pressure region 26 in FIG. 2 in turbomachine 500 is region 556 adjacent seals 520' and 520". Thus, it is between (a) the portion of impeller blade passage 540 in fluid communication with seals 520' and 520" and (b) region 556 that the seals are capable of maintaining a pressure differential well in excess of that maintainable by known contact or brush seals, at the relatively low leakage rates discussed above.

Seals 520' and 520" may constitute any one of seals 120, 220, 320 or 420 described above. Turbomachine 500 is provided as an exemplary, and not limiting, example of the context in which the turbomachinery seals of the present invention will be used. Thus, for example, seals 520' and 520" may be used in turbomachinery that does not include a diffuser 552 and/or a volute 554.

In operation, the turbomachinery seal of the present invention, identified generically as seal 20, and in a first embodiment as seal 120, in a second embodiment as seal 220, in a third embodiment as seal 320, and in a fourth embodiment as seal 420, all possess the important feature of being able to seal pressure differentials between high pressure region 24 and low pressure region 26 at leakage rates which, in combination, are not believed to be achievable with known turbomachinery seals. Thus, in the case of seal 120, when relative rotational movement is occurring between shaft 34 and plates 128, the seal is capable of maintaining a pressure differential between high pressure region 24 and low pressure region 26, well in excess of the 250–300 psi pressure differential which current contact in brush seals are capable of sealing. Indeed, it is believed that seal 120 may be used to seal pressure differentials in excess of 1,000 psi. The sealing of such pressure differentials is achieved such that flow rate of fluid from high pressure region 24 to low pressure region 26 across seal 120 is as little as 20% or less of what such flow rate would be through annular space 140 if the radial inner ends of plates 128 were not present in the annular space. Similar pressure differentials may be sealed with seals 220, 320 and 420, at even lower leakage rates, i.e., as little as 10% or less of what the flow would be through annular space 260 and corresponding annular spaces for seals 320 and 420 if bristles were not present in the annular spaces.

In a working embodiment of the present invention, seal 220 was tested in a high pressure seal test rig with pressure differentials between high pressure region 24 and low pressure region 26 of 1,200 psi. To maintain a safety factor, the testing was restricted to a pressure differential of 1,000 psi. Instrumentation and measurement techniques were employed for pressure and flow to provide reliable measurements with an accuracy of about ±5 psi and ±1 gpm. Rotational speeds of 0 rpm, 1,000 rpm, 2,000 rpm, and 3,495 rpm were used. Shaft 34 had an outside diameter of 5". Shaft 34 is made from Inconel 718 superalloy and bristles 254 were made from Haynes 25 superalloy. Bristles 254 had an interference of about 0.005" with surface 36 of shaft 34, and had a diameter of about 0.0025". Taper 278 was provided on both surfaces 270 and 272 of annular plates 256, had an angle $\phi$ of 4° and extended over an axial length of about 0.007". Four bristle beds 252 and five annular plates 256 were used, with the width, i.e., axial thickness of the bristle beds being about 0.050".

The results of the test using the working embodiment were dramatic relative to known turbomachinery seals. Pressure differentials of 1,000 psi, the limit of the test rig, were achieved at leakage rates of only 6.4 gpm. Seal 220 was capable of sealing these pressure differentials at the four test speeds used, with little change in leakage rates. Leakage was less at lower pressure differentials. For example, at a pressure differential of 300 psi, a leakage rates of about 4.3 gpm were achieved and at pressure differential of 700 psi, a leakage rate of about 5.8 gpm was achieved. This is believed to be less than 10% of what the leakage would be through annular space 26 if bristles 254 were not present in such annular space.

The turbomachinery seals of the present invention possess important industrial applicability. In particular, turbomachinery seals of the present invention may be used in a wide range of turbomachinery, including, for example, gas turbine engines and turbo rocketpumps, under operating regimes not previously attainable. The ability to seal relatively high pressure differentials at relatively low leakage rates permits enhancement of various operational characteristics of turbomachinery, which in turn increases the overall efficiency and output thereof.

The turbomachinery seals of the present invention have been described above as mounted on an annular member, e.g., annular member 130, surrounding shaft 34. However, the present invention encompasses the mounting of the seal elements 28, i.e., plates 128, bristles 254, bristles 334 and bristles 434, on a radially inner member (not shown) such that the elements rotatably engage the surface of a surrounding, radially outer member. Furthermore, while the seals of the present invention have been described in connection with shaft 34, it is to be appreciated that impeller hubs and other structure may be substituted for the shaft. Furthermore, while the turbomachinery seal of the present invention has been described in the context of relative rotational movement between the seal and shaft 34, it is to be appreciated the seal may be used as a flow limiter. In this application, both the seal and shaft 34 are maintained stationary with respect to one another.

As these and other changes may be made in the turbomachinery seals described above without departing from the scope of the present invention, it is intended that all matter contained in the above description or shown in the accompanying drawings shall be interpreted in an illustrative and not in a limiting sense.

What is claimed is:

1. A seal assembly designed for rise with a first member between a high pressure region and a low pressure region, the assembly comprising:

a. a support with a central axis; and b. a sealing means for engaging the first member and, when said sealing means is engaged with the first member, maintaining a pressure difference of greater than 300 psi between the high pressure region and the low pressure region while permitting relative rotational movement between the first member and said sealing means, said sealing means being attached to said support so that a portion of said sealing means extends radially beyond said support, said portion defining an annular space, said sealing means limiting leakage between the high pressure region and the low pressure region when said sealing means is engaged with the first member such that fluid flow from the high pressure region to the low pressure region through said sealing means does not exceed thirty percent of what said fluid flow would be through said annular space if said portion of said sealing means did not occupy said annular space, said sealing means having a plurality of bristles and at least one second member that includes a tapered portion having a taper confronting said plurality of bristles and located proximate the first member when the seal assembly is engaged with the first member.

2. A seal assembly according to claim 1, wherein said sealing means is designed such that said fluid flow from the high pressure region to the low pressure region through said annular space does not exceed twenty percent of what said fluid flow would be through said annular space if said portion of said sealing means did not occupy said annular space.

3. A seal assembly according to claim 1, wherein said sealing means is designed such that said fluid flow from the high pressure region to the low pressure region through said annular space does not exceed ten percent of what said fluid flow would be through said annular space if said portion of said sealing means did not occupy said annular space.

4. A seal assembly according to claim 1, wherein said second member comprises an annular ring.

5. A seal assembly according to claim 1, further comprising a plurality of second members, wherein each second member comprises an elongate structure.

6. A seal assembly according to claim 5, wherein said plurality of bristles forms a bristle bed and said plurality of second members extend into said bristle bed.

7. A brush seal intended for use with a first member, the seal comprising:

a. a support having a central axis;

b. a plurality of annular plates attached to said support so that each of said plates is spaced a first axial distance from adjacent plates, as measured along said central axis, so as to form a cavity between pairs of adjacent plates, wherein each of said plates has an axial thickness, a radially inner end and a radially outer end, with at least one of said plurality of plates having a taper adjacent said radially inner end in which said axial thickness decreases from (i) a first amount proximate, but spaced from, said radially inner end to (ii) a second, lesser, amount at said radially inner end; and c. a plurality of bristles positioned in said cavity;

d. wherein said taper confronts said plurality of bristles.

8. A brush seal according to claim 1, wherein, when said brush seal is used with the first member, said plurality of bristles is sized to engage the first member with an interference fit during relative rotational movement between the first member and said plurality of bristles.

9. A brush seal according to claim 8, wherein, when said brush seal is used with the first member, at least some of said plurality of bristles are sized so as to have an interference with the first member of about 0.002" to 0.007".

10. A brush seal according to claim 9, wherein said interference is about 0.0035".

11. A brush seal according to claim 8, wherein at least some of said plurality of bristles have a thickness ranging from 0.0015" to 0.0035".

12. A brush seal according to claim 11, wherein said thickness is about 0.0025".

13. A brush seal according to claim 7, wherein said plurality of bristles are positioned relative to said support so that said bristles form an angle θ with respect to radii of said central axis, wherein θ ranges from 30° to 55°.

14. A brush seal according to claim 13, wherein θ is about 45°.

15. A brush seal according to claim 7, wherein adjacent ones of said plurality of bristles have a gap there between of no more than about 0.0005".

16. A brush seal according to claim 7, wherein said plurality of bristles have a radial length, further wherein said annular plates have a radial length selected so that said annular plates block axial movement parallel to said central axis of a first portion of said radial length of said plurality of bristles and do not block axial movement of a second portion of said radial length of said plurality of bristles.

17. A brush seal according to claim 16, wherein the length ratio of said first portion to said radial length is at least 0.8.

18. A brush seal according to claim 7, wherein said taper is inclined with respect to radii of said central axis at an angle ranging from 2° to 15°.

19. A brush seal intended for use with a first member, the seal comprising:

a. a support having a central axis;

b. a plurality of bristles attached to said support so as to form an annular bristle bed surrounding said central axis; and c. a plurality of elongate structures, each having a longitudinal axis, attached to said support so as to be positioned within said bristle bed such that each of said plurality of elongate structures is immediately laterally surrounded 360° by said bristle bed, wherein said plurality of elongate structures are less flexible than said plurality of bristles.

20. A brush seal according to claim 19, wherein at least some of said plurality of elongate structures each have a circular cross-sectional configuration in a plane perpendicular to the corresponding said longitudinal axis.

21. A brush seal according to claim 20, wherein at least some of said plurality of elongate structures have a proximal end attached to said support and a distal end, further wherein said distal end has a tapered configuration.

22. A brush seal according to claim 19, wherein at least some of said elongate structures each have a non-circular cross-sectional configuration in a plane perpendicular to the corresponding said longitudinal axis.

23. A brush seal according to claim 19, wherein, when said brush seal is used with the first member, said plurality of bristles are sized to engage the first member with an interference fit ranging from 0.002" to 0.007".

24. A brush seal according to claim 19, wherein said brush seal, when used with the first member and positioned between a high pressure region and a low pressure region, maintains a pressure differential between said regions of at least 300 psi during relative rotational movement between said bristles and the first member.

25. A brush seal according to claim 19, wherein said support has an inner circumference and said plurality of elongate structures are arranged so that ones of said plurality of elongate structures are spaced from one another along said inner circumference.

26. A brush seal according to claim 25, wherein said plurality of elongate structures are arranged in a plurality of groups such that at least some of said plurality of groups are spaced from one another along said inner circumference.

27. A turbomachine comprising:

a. a first region;

b. a first member supported for rotation about a central axis;

c. a housing having a second region in which said first member is received, said second region being sized and configured so that said first member can rotate relative to said housing within said second region; and d. a sealing means for maintaining a pressure difference of greater than 300 psi between said first region and said second region while permitting relative rotational movement between said first member and said housing, said sealing means engaging said first member and said housing so that a portion of said sealing means extends radially beyond said housing, said portion defining an annular space, said sealing means limiting leakage between said first region and said second region such that fluid flow between said first region to said second region through said sealing means does not exceed thirty percent of what said fluid flow would be through said annular space if said portion of said sealing means did not occupy said annular space, said sealing means having a plurality of bristles and at least one second member that includes a tapered portion having a taper confronting said plurality of bristles and located proximate the first member when the seal assembly is used with the first member.

28. A turbomachine comprising:

a. a first region;

b. a first member supported for rotation about a central axis;

c. a housing having a second region in which said first member is received, said second region being sized and configured so that said first member can rotate relative to said housing within said second region; and d. a seal, comprising:

i. a support attached to said housing;

ii. a plurality of annular plates attached to said support so that each of said plates is spaced a first axial distance from adjacent plates, as measured along said central axis, so as to form a cavity between adjacent plates, wherein each of said plates has an axial thickness, a radially inner end and a radially outer end, with at least one of said plurality of plates having a taper adjacent said radially inner end in which said axial thickness decreases from (i) a first amount proximate, but spaced from, said radially inner end to (ii) a second, lesser, amount at said radially inner end; and iii. a plurality of bristles positioned in at least some of said cavities;

iv. wherein said taper confronts said plurality of bristles.

29. A turbomachine comprising:

a. a first region;

b. a first member supported for rotation about a central axis;

c. a housing having a second region in which said first member is received, said second region being sized and configured so that said first member can rotate relative to said housing within said second region; and d. a seal, comprising:

i. a support attached to said housing;

ii. a plurality of bristles attached to said support so as to form an annular bristle bed surrounding said central axis; and iii. a plurality of elongate structures attached to said support so as to be positioned within said bristle bed such that each of said plurality of elongate structures is immediately laterally surrounded 360° by said bristle bed, wherein said plurality of elongate structures are less flexible than said plurality of bristles.

30. A turbomachine according to claim 29, wherein said support of said seal has an inner circumference and said plurality of elongate structures are arranged so that ones of said plurality of elongate structures are spaced from one another along said inner circumference.

31. A turbomachine according to claim 30, wherein said plurality of elongate structures are arranged in a plurality of groups such that at least some of said plurality of groups are spaced from one another along said inner circumference.

\* \* \* \* \*